Sept. 11, 1934.   R. W. OGLESBY   1,973,014
VEHICLE DUMPING MECHANISM
Filed Feb. 15, 1933   5 Sheets-Sheet 2

Fig. 2

Inventor
RICHARD W. OGLESBY
By Paul, Paul & Moore
ATTORNEYS

Sept. 11, 1934.   R. W. OGLESBY   1,973,014
VEHICLE DUMPING MECHANISM
Filed Feb. 15, 1933   5 Sheets-Sheet 4

Inventor
RICHARD W. OGLESBY
ATTORNEYS

Sept. 11, 1934.                R. W. OGLESBY                1,973,014
                        VEHICLE DUMPING MECHANISM
                      Filed Feb. 15, 1933        5 Sheets—Sheet 5

Inventor
RICHARD W. OGLESBY
By Paul Paul Moore
            ATTORNEYS

Patented Sept. 11, 1934

1,973,014

UNITED STATES PATENT OFFICE 1,973,014

VEHICLE DUMPING MECHANISM

Richard Woodie Oglesby, Canton, S. Dak.

Application February 15, 1933, Serial No. 656,883

16 Claims. (Cl. 214—46.5)

This invention relates to new and useful improvements in vehicle dumping mechanisms and more particularly to such a mechanism adapted for use in connection with a vehicle-supporting or weighing platform to elevate a vehicle to an inclined load-dumping position.

An object of the invention is to provide in combination with a vehicle-supporting platform, a hoisting mechanism mounted for movement lengthwise of the platform and having means adapted to engage a vehicle and elevate it to an inclined load-dumping position.

A further object is to provide in combination with a vehicle-supporting platform, a dumping mechanism comprising a carriage mounted for traveling movement lengthwise of the platform, and having a hoist supported thereon comprising a member adapted to engage a portion of a vehicle such as the front axle, and elevate the vehicle to an inclined load dumping position, and having means for controlling the traveling movement of the carriage whereby said member may be quickly moved into registration with the front axle of the vehicle.

A further object is to provide in combination with a weighing platform, a movable hoist mounted for traveling movement beneath the platform whereby, when the vehicle is driven onto the platform in position to dump its load through the usual grate provided adjacent one end of the platform, the hoist may be moved into alinement with the front axle of the vehicle, regardless of the length of the latter, so as to elevate the vehicle to a load-dumping position, and whereby a single hoist may be used for tilting various sizes of vehicles.

A further object is to provide a vehicle-dumping mechanism comprising a carriage mounted for traveling movement and carrying a cylinder having a plunger operatively mounted therein, said plunger comprising a plurality of telescoping members, whereby the overall length of the cylinder may be shortened to the extent that the pit provided beneath the platform or runway upon which the vehicle is positioned, when being tilted to a load-dumping position, may be made comparatively shallow, as compared to installations of this general character now in use.

Other objects of the invention reside in the simple and inexpensive construction of the hoisting mechanism whereby it may be suspended directly from the vehicle-supporting or weighing platform, or whereby it may be supported upon a suitable track permanently located beneath the platform and independently thereof, so that the weight of the hoisting mechanism is not carried by the platform; in the means provided for interrupting the upward movement of the plunger before it reaches the limit of its normal upward travel, whereby the apparatus may be safely used for tilting a comparatively short vehicle to a load-dumping position without the usual danger of overturning it, and also whereby said means may be rendered inoperative so that the plunger may be moved to the limit of its upward travel, as when used for dumping a vehicle having a relatively long wheel base; in the indicating means provided in connection with the carriage for alining the plunger with that portion of the vehicle to be engaged thereby; in the means provided for controlling the traveling movement of the carriage whereby the plunger may be quickly moved into alinement with the vehicle; and, in the means for maintaining closed the elongated opening provided in the platform for the plunger, regardless of the position of the hoisting mechanism.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

Figure 1:
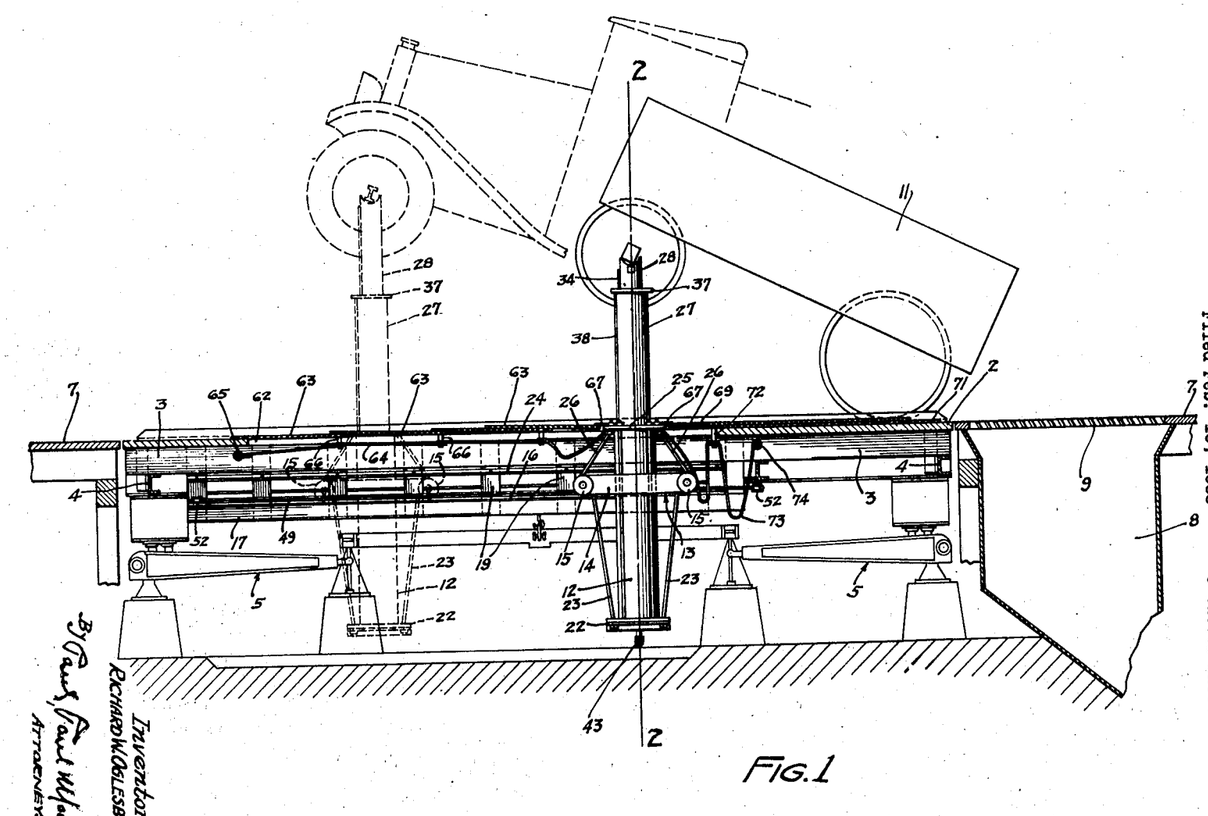
Figure 1 is a longitudinal sectional elevation showing a conventional weighing platform with the invention applied thereto.
Figure 2:
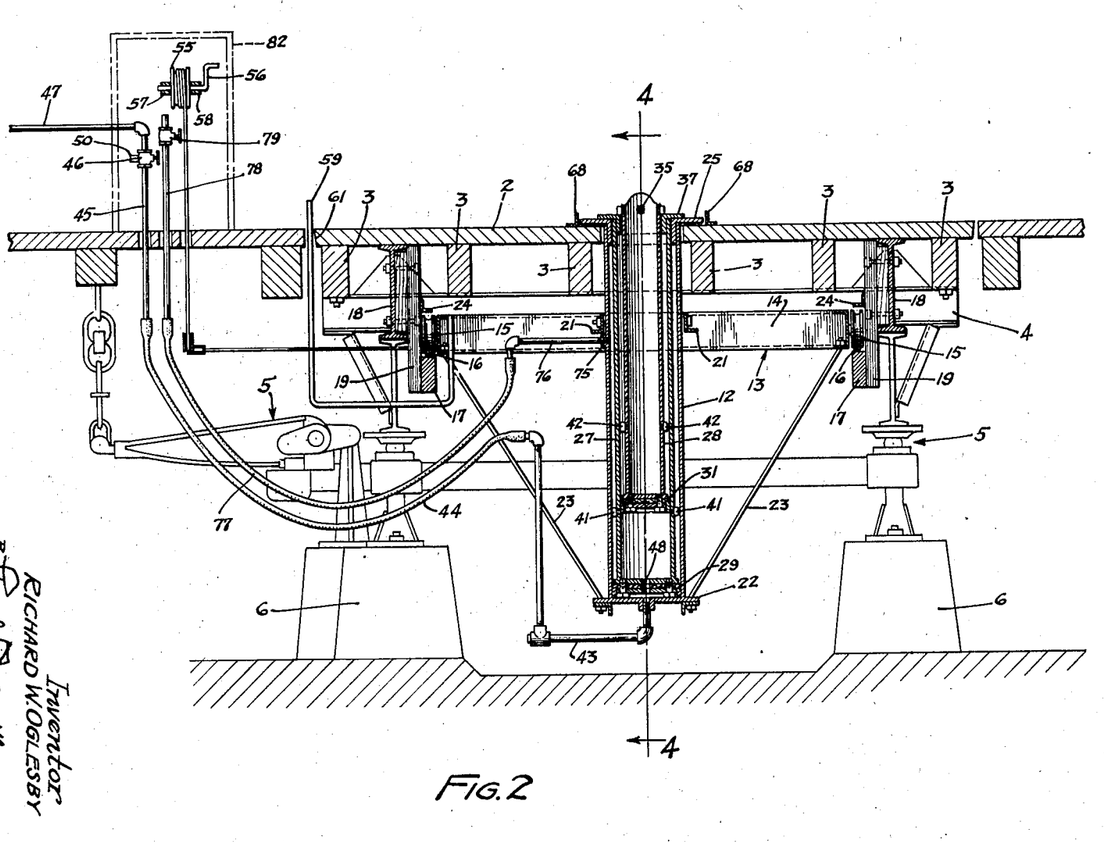
Figure 2 is a cross-sectional view on the line 2—2 of Figure 1, showing the plunger in its normal inoperative or nested position within the cylinder.

In the selected embodiment of the invention here shown, there is illustrated in Figures 1 and 2, for purposes of disclosure, a weighing platform 2 comprising a plurality of longitudinally extending stringers 3 shown connected together at their ends by suitable cross channel members 4. The usual weighing scale mechanism is shown in Figures 1 and 2 and is generally indicated by the numeral 5. This mechanism movably supports the platform 2 upon suitable piers or foundations 6 provided in the pit beneath the platform. As this part of the mechanism is common and well-known, it is thought unnecessary to herein describe the same in detail. The platform 2 is shown horizontally alined with the usual runway or floor 7 and a chute 8 may be provided at one end of the platform having a suitable grate 9 over its top through which the material or grain is discharged from the vehicle 11, when tilted to a load-dumping position, as shown in Figure 1.

An important feature of the invention hereindisclosed resides in movably mounting the hoisting mechanism beneath the platform so that said mechanism may readily be moved into alinement with the front axle of the vehicle, after the latter has been brought to a stop upon the platform.

The hoisting mechanism is shown comprising a cylinder 12 supported on a suitable carriage 13, shown comprising a rectangular frame 14 provided at its ends with suitable peripherally grooved carrying wheels 15, mounted to travel upon tracks 16 here shown supported upon suitable beams 17 secured to a pair of longitudinally extending I-beams 18, suitably secured to the platform by suitable hangers 19. The upper portion of the cylinder 12 is suitably secured to the frame 14 by means of cross members 21, preferably of angular cross section, as best shown in Figure 2. The lower portion or end of the cylinder is provided with a flanged head 22 suitably secured thereto and having brace rods 23 connecting it with the end members of the rectangular frame 13 of the carriage, as more clearly shown in Figure 2. By thus suspending the cylinder from the carriage frame 14, it will be adequately braced to said frame whereby it will always be maintained in substantially a vertical position, regardless of the load carried thereby, when the hoist is being operated to hoist the forward end of a vehicle. Suitable guide members 24 are secured to the hangers 19 at each end of the carriage frame 14 above the wheels 15, to prevent the latter from jumping or becoming disengaged from the tracks 16. The upper end of the cylinder is shown provided with a flanged head 25, having brace rods 26 connecting it with the carriage frame 14, as shown in Figure 4.

Another feature of this invention resides in the novel construction of the plunger mounted within the cylinder. This plunger, as best shown in Figures 2 and 4, comprises telescoping members 27 and 28, the former being slidably supported in the cylinder 12 and having a suitable packing 29 at its lower end forming a head which snugly fits the bore of the cylinder 12. The section 28 is slidably mounted in the section 27 and has a suitable packing 31 secured to its lower end which similarly fits the bore of the section 27. The upper end of the section 28 is preferably formed, as shown in Figure 4, to provide a saddle 32 adapted to receive the front axle 33 of a vehicle.

A suitable rod 34, preferably square in cross section, has a horizontal end portion 35 received in suitable apertures provided adjacent the upper end of the section 28, and has its vertical portion suitably secured to the periphery of the section 28. This rod is received in a key-way or groove 36 provided in a head 37 secured in the upper end of the telescoping member 27, as best shown in Figure 5. The rod 34 cooperates with the key-way 36 to prevent the plunger section 28 from relatively rotating within the section 27. In like manner, the section 27 has a similar rod 38 secured to the periphery thereof adapted to travel in a key-way 39 provided in the the cylinder head 25, as shown in Figure 6. This rod prevents the section 27 from relatively rotating within the cylinder 12.

Figures 4, 5, 6, 7:
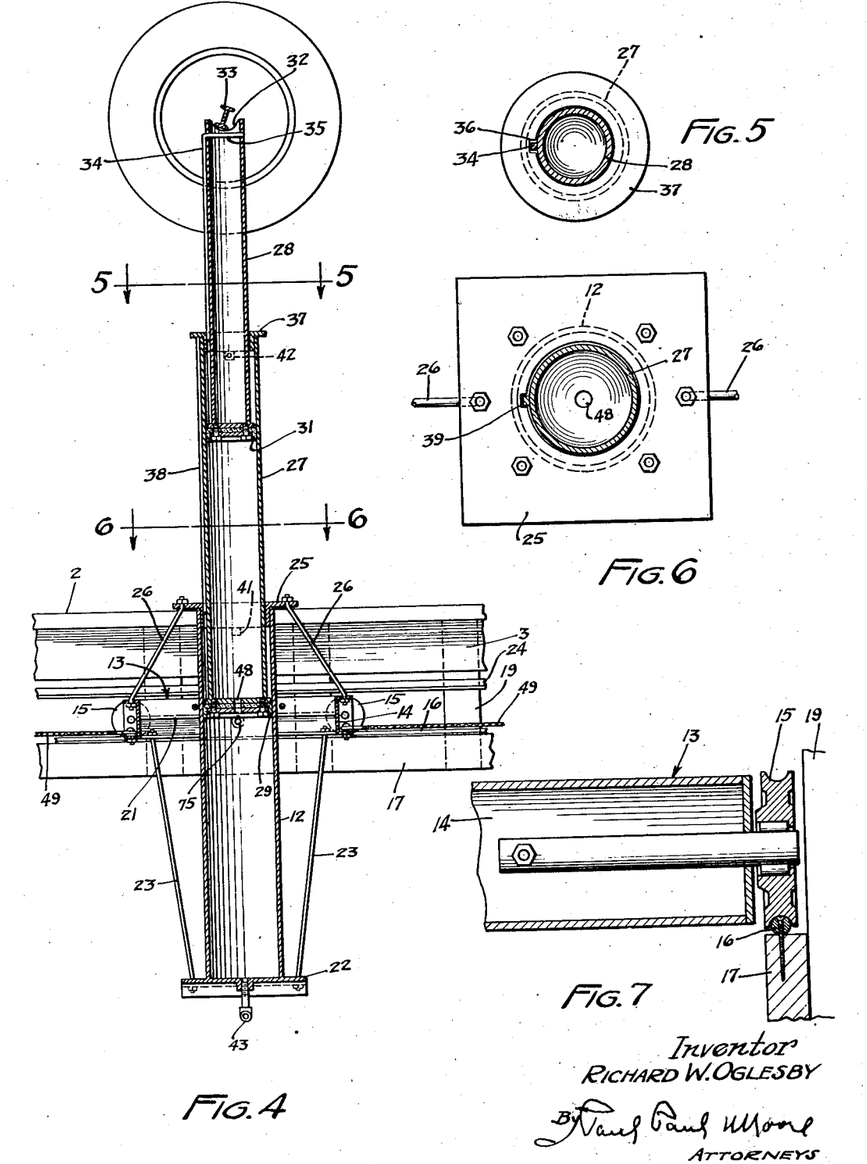
Figure 4 is a vertical sectional view on the line 4—4 of Figure 2, showing the plunger in its extended or load-lifting position.
Figure 5 is an enlarged sectional plan view on the line 5—5 of Figure 4.
Figure 6 is a sectional plan view on the line 6—6 of Figure 4.
Figure 7 is an enlarged detail sectional view on the line 7—7 of Figure 3.

Suitable stops 41 and 42 are provided respectively upon the plunger sections 27 and 28 adapted to engage the lower faces of the heads 25 and 37 to thereby limit the relative upward movements of the plunger sections 27 and 28, as will readily be understood by reference to Figures 2 and 4.

A pipe 43 has one end supported in the head 22 of the cylinder 12 and communicates with the interior of the cylinder. To the opposite end of this pipe, one end of a suitable flexible hose connection 44 is connected, the opposite end of which may be connected to a pipe 45 provided with a control valve 46, whereby the supply of pressure fluid or air to the cylinder may be controlled. A pipe 47 connects the valve 46 with a suitable source of air under pressure, not shown in the drawings. The control valve 46 is of the usual three-way type, and has an outlet 50 to the atmosphere by means of which the air in the cylinder may be released therefrom to permit the plunger to return to its lower nested position, as shown in Figure 2.

When the valve 46 is operated to establish communication between the pipes 45 and 47, air will be introduced into the bottom of the cylinder 12, whereby the plunger section 27 will be elevated until the stops 41 engage the lower edge of the head 25 of the cylinder, after which the pressure fluid delivered into the lower portion of the cylinder from the pipe 43 will pass through an aperture 48 in the head 29 of the plunger section 27, and impinge against the packing or head 31 at the lower end of the plunger section 28 and cause the latter to be projected from the section 27 to the position shown in full lines in Figure 4 and dotted lines in Figure 1.

Figure 3:
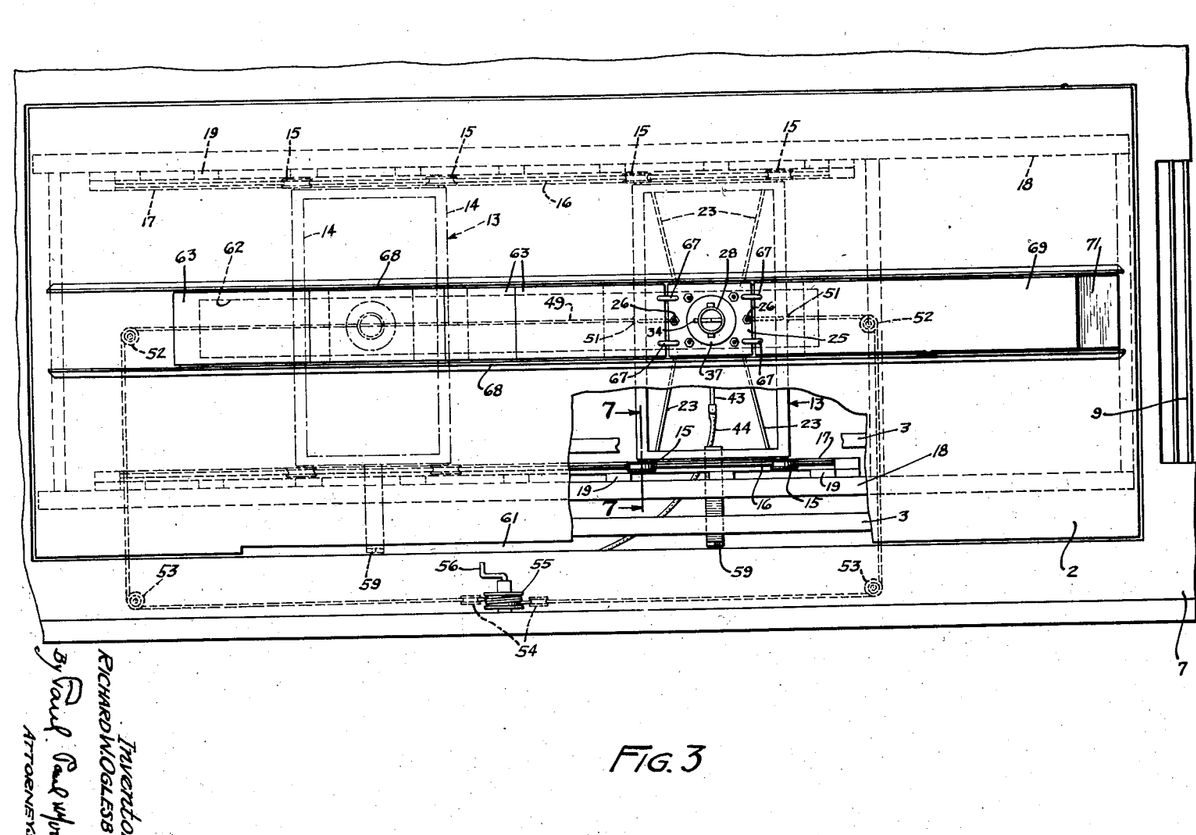
Figure 3 is a plan view of Figure 1, partially broken away to more clearly show the means for alining the plunger with the vehicle axle, and also showing the means for controlling the traveling movement of the carriage.

Means is shown provided for controlling the traveling movement of the carriage 13 and may consist of a suitable cable 49 having its ends suitably secured to the opposite sides of the carriage 13 at points indicated by the numerals 51 in Figure 3. The cable 49 has running connections with a pair of sheaves 52, suitably supported upon the platform 2, and a pair of similar sheaves 53 which may be mounted upon the supporting structure of the platform. The cable is also shown having running connections with a pair of sheaves 54, and is coiled about a drum 55 shown provided with a suitable operating crank 56 mounted in suitable bearings 57 and 58 which may be supported by a suitable structure, not shown in the drawings. By arranging the cable 49 as above described, when the crank 56 is rotated in one direction, the carriage will travel in one direction lengthwise of the platform, and when the crank is rotated in the opposite direction, the traveling movement of the carriage will be reversed by operating the carriage by means of a cable as above described, the winding drum 55 may be situated at a convenient location remote from the platform, whereby the operator may readily control the traveling movement of the carriage to move the plunger into registration with the particular part of the vehicle to be engaged thereby.

In order to facilitate alining the plunger with the front axle or portion of the vehicle, a suitable indicating means is provided, which is here shown comprising an indicating member 59 mounted to travel in a slot or gap 61 provided at one side of the platform, as shown in Figures 2 and 3. The member 59 is suitably secured to the carriage 13 for direct movement therewith, and is alined with the plunger, as clearly shown in Figure 3. By means of the above indicating means, the operator may quickly aline the plunger with the vehicle axle by simply turning the crank 56 until the pointer or member 59 is substantially alined with the hub of one of the wheels of the vehicle.

In the arrangement of the hoist, as shown in Figures 1 to 4, inclusive, an elongated opening 62 is provided in the platform 2, as indicated by the dotted lines in Figure 3 and full lines in Figures 1 and 2, adapted to receive the upper end of the cylinder 12, as clearly shown in Figure 2. By the provision of the opening 62, the cylinder may be freely moved back and forth with respect to the platform to aline the plunger with the front axle of the vehicle.

Means is provided for closing the opening 62 in the platform to prevent anyone from stepping into it, and to prevent articles and other foreign matter from dropping through the platform into the pit provided therebeneath. Such means is shown comprising a plurality of plate elements 63 arranged in overlapping relation at the left hand side of the plunger, when viewed as shown in Figure 1. The plates 63 are operatively connected together by a suitable flexible element, such as a cable 64, having one end connected to the cylinder head 25, and its opposite end to the intermediate rails 3 at one end of the platform, as indicated at 65 in Figure 1. Each plate element 63 may be provided at one side with a depending stud 66, to which the cable 64 may be secured. The plate 63 adjacent to the cylinder is connected directly to the cylinder head 25 by suitable connectors 67, as shown in Figure 3, so that this particular plate moves synchronously with the cylinder head 25. Suitable guide rails 68 are provided at each side of the opening 62 between which the plates 63 are slidably mounted, as will readily be understood by reference to Figures 1, 2, and 3.

A pair of relatively longer plates 69 and 71 are arranged in overlapping relation at the opposite side of the cylinder. The plate 69 is connected to the cylinder head by clips 67, and the plate 71 is shown provided with a depending stud 72 having a cable or flexible element 73 secured thereto. One end of this cable is secured to the cylinder head 25, and its opposite end to the rails 3 of the platform, as indicated at 74. By arranging the plates 63 in overlapping relation and operatively connecting them together and to the cylinder head 25, and by similarly arranging the plates 69 and 71 at the opposite side of the cylinder, the slot 62 in the platform will always be closed, regardless of the position of the plunger and, at the same time, the plunger is permitted freedom of movement in said slot so that it may readily be moved into registration with the vehicle axle, or that portion of the vehicle with which it is to be engaged to tilt the vehicle to a load-dumping position.

When using a single hoisting mechanism for elevating wagons of different sizes, it is desirable that means be provided whereby, when the hoist is used for lifting a vehicle having a relatively short wheel base, the upward movement of the plunger may be positively interrupted, when the plunger reaches a predetermined elevation in its upward travel, thereby eliminating the danger of overturning the vehicle, should the operator inadvertently neglect to cut off the supply of air to the cylinder.

Such means is here shown comprising a relief port 75 provided in the wall of the cylinder 12 and having one end of a pipe 76 connected therewith, the opposite end of which may be connected by a flexible connection 77, to a pipe 78 having a control valve 79 therein. When the valve 79 is open, and the control valve 46 is operated to permit air to enter the lower end of the cylinder, the plunger sections 27 and 28 will be elevated, the pressure of the air impinging against the head 29 of the plunger section 27 and thereby forcing said section upwardly until it passes the relief port 75, whereupon the air delivered into the cylinder will escape therefrom through the pipe 76 and through the open valve 79 to the atmosphere. Such release of the air from the cylinder will interrupt the upward travel of the plunger so that it will come to rest in the position shown in full lines in Figure 1.

When it is desired to lower the piston to return the vehicle to its normal horizontal position upon the platform, the valve 46 is manipulated to establish communication between the discharge 50 of the valve and pipe 45, whereupon the air will be released from the lower portion of the cylinder and thereby allow the plunger to return to its normal lowered position. When the apparatus is to be used for elevating a vehicle having a comparatively longer wheel base such as a large truck, the valve 79 is closed, whereby the telescoping sections 27 and 28 of the plunger may be extended to the limit of their upward travel, as indicated in dotted lines in Figure 1, thereby tilting the vehicle to an angle sufficient to cause the contents thereof to readily discharge from the rear end thereof.

The control mechanism on the hoist may be housed within a suitable casing 82, as indicated by the dotted lines in Figure 2, so that when the apparatus is not in use, said mechanism may be enclosed therein to prevent unauthorized persons from tampering therewith.

Figure 8:
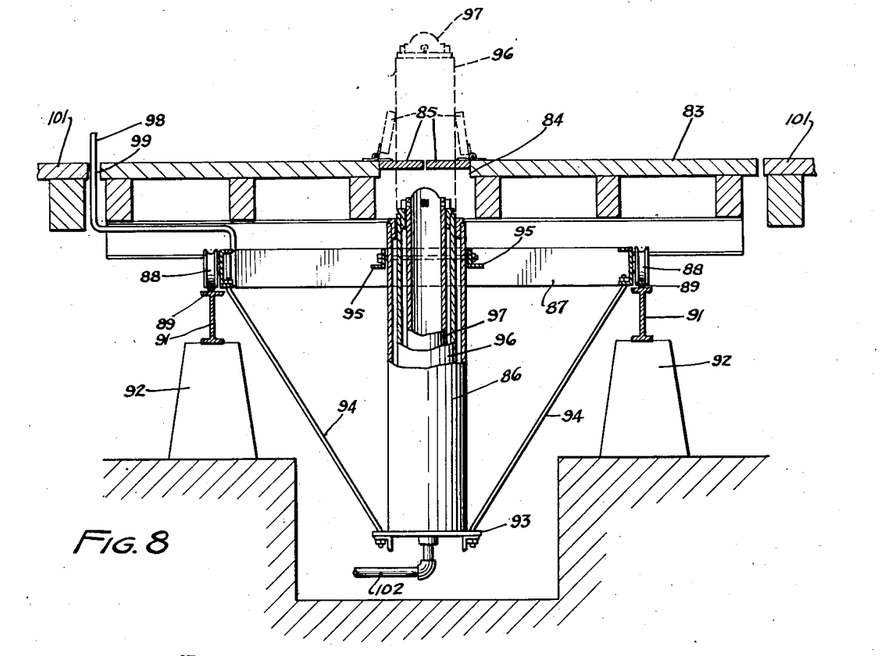
Figure 8 is a view showing an installation wherein the hoisting mechanism is mounted independently of the platform.
Figure 9:
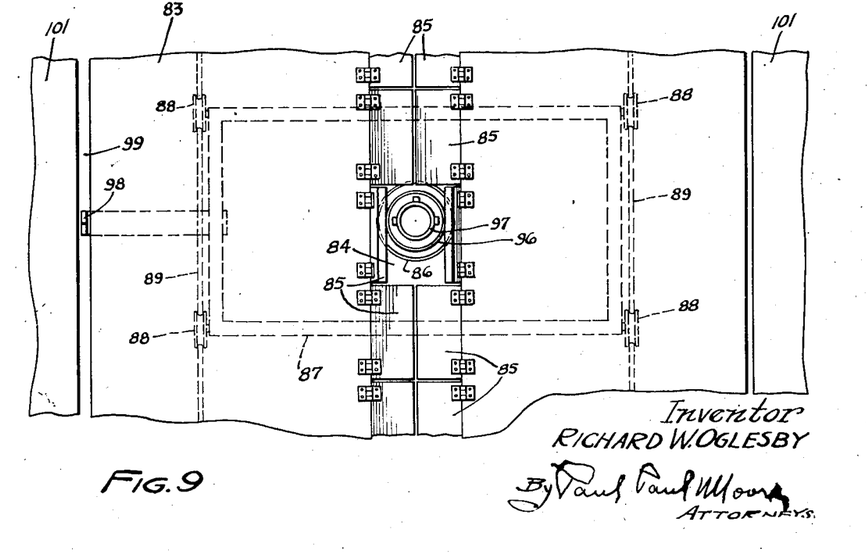
Figure 9 is a plan view of Figure 8.

Figures 8 and 9 illustrate a construction comprising a platform 83 provided with a hoisting mechanism which is supported independently of the platform. The platform has an elongated opening 84 therein through which the plunger may be projected, as indicated by the dotted lines in Figure 8. This opening may be normally closed by means of a plurality of hinged members 85, which preferably are provided with means for normally holding them in closed position, but are so arranged that when the plunger impinges thereagainst in its upward movement, they will open, as indicated by the dotted lines in Figure 8.

The hoisting mechanism disclosed in Figure 8 and 9 comprises a cylinder 86 suitably supported on a carriage frame 87 provided with grooved wheels 88 adapted to travel upon tracks 89, shown secured to a pair of I beams 91 which may be supported upon suitable foundations or piers 92. The lower end of the cylinder has a head 93, similar to the head 22 of the cylinder 12, which head is connected with the end frame members of the carriage by suitable brace rods 94. The upper end of the cylinder 86 is suitably supported between a pair of cross rails 95 secured to the carriage frame 87, and the plunger is shown comprising telescoping members 96 and 97 mounted for relative movement within the cylinder in a manner similar to the corresponding plunger sections 27 and 28 of the cylinder 12.

An indicating member 98 is secured to the carriage 87 for alining the plunger with the axle of the vehicle, and is movable in a slot or gap 99 provided between one edge of the platform 83 and the floor 101 adjacent thereto. Air is supplied to the lower end of the cylinder through a pipe 102, similar to the pipe 43 of the cylinder 12.

The novel hoisting mechanism herein disclosed has been found very useful in connection with weighing platforms and other vehicle supporting platforms upon which loaded vehicles may be driven for unloading. By constructing the plunger of a plurality of sections, arranged in telescoping relation, the overall length of the cylinder may be shortened, as compared with the cylinders of devices of this general character now in common use, and without limiting the upward travel of the plunger. This is a very desirable feature in that the usual pit required beneath the platform or runway may be made comparatively shallow. In some instances, it has been found practically impossible to install regular dumping equipment because of obstructions encountered beneath the platform, making it impossible to provide a pit having sufficient depth to accommodate cylinders. In addition to its use in connection with weighing platforms, the hoist may also be used in connection with runways such as are commonly found at grain elevators and terminals, onto which the vehicles are driven for unloading. As a result of mounting the hoist for traveling movement lengthwise of the platform, a single cylinder may be utilized for handling vehicles having wheel bases of varying lengths without, in any way, changing the construction of the apparatus. The plunger may also be readily and quickly moved from one place to another to aline it with the front axle of the vehicle by means of the crank 56, after the vehicle has been driven onto the unloading platform or runway.

I claim as my invention:

1. The combination with a vehicle-supporting platform, of suitable rails supported beneath said platform, a carriage movable on said rails in a direction lengthwise of the platform, a pneumatic hoist supported on said carriage and comprising a plunger adapted to engage a vehicle supported on the platform and tilt it to a load-dumping position, and means secured to the carriage and alined with the plunger transversely of the platform and movable in a slot in the platform to thereby facilitate alining the plunger with the front axle of the vehicle.

2. The combination with a vehicle-supporting platform, of a carriage mounted for traveling movement beneath said platform in a direction lengthwise thereof, a hoist supported on said carriage and comprising a member adapted to be moved into engagement with a vehicle supported on the platform and tilt it to a load-dumping position, said platform having an opening therein for said member, and a plurality of overlapping elements operatively connected to the hoist and constantly closing said slot, regardless of the movement of the hoist therein.

3. The combination with a vehicle-supporting platform, a carriage mounted for traveling movement beneath said platform in a direction lengthwise thereof, a hoist supported on said carriage and comprising a member adapted to be moved into engagement with a vehicle supported on the platform and tilt it to a load-dumping position, said platform having an elongated opening for said member, and means for closing said elongated opening comprising a plurality of overlapping elements adapted to be actuated by traveling movement of the hoist to maintain said opening closed, regardless of the position of said hoist.

4. The combination with a vehicle-supporting platform, of a carriage mounted for traveling movement beneath said platform in a direction lengthwise thereof, a fluid-operated hoist supported on said carriage and comprising a plunger adapted to be moved into engagement with a vehicle supported on the platform and tilt it to a load-dumping position, said platform having a narrow, elongated opening therein for said plunger, guides at opposite sides of said opening, a plurality of overlapping plates slidably supported between said guides and cooperating to provide a closure for said opening, and means operatively connecting said plates to the hoist whereby they are actuated by traveling movement thereof.

5. The combination with a weighing platform having an elongated opening therein, of a hoist mounted for traveling movement lengthwise of the platform and including a cylinder, a plunger operatively mounted in said cylinder and adapted to traverse said elongated opening, means on the plunger adapted to engage a vehicle supported on the platform and tilt it to a load-dumping position when the plunger is operated, and means for closing the elongated opening in the platform, comprising a plurality of plate elements having flexible means connecting them together whereby they may slide over one another when the plunger is relatively moved.

6. The combination with a weighing platform having an elongated opening therein and comprising a pair of longitudinally extending beams, of a pair of rails secured to said beams, a carriage mounted for traveling movement on said rails, a hoist supported on said carriage and comprising a cylinder having a plunger operatively mounted therein, and adapted to traverse said elongated opening, means on the plunger adapted to engage a vehicle supported on the platform and tilt it to a load-dumping position, when the plunger is operated and means operatively associated with the plunger for closing said elongated opening, comprising a plurality of overlapping elements.

7. The combination with a vehicle supporting platform having an elongated opening therein, of a carriage mounted for traveling movement beneath said platform in a direction lengthwise thereof, a hoist supported on said carriage and including an upright cylinder, a plunger operatively mounted within said cylinder, adapted to traverse said elongated opening and comprising a plurality of telescoping members, one of which is adapted to engage a vehicle supported on the platform and tilt it to a load-dumping position, when the plunger is operated, means for introducing air into the lower portion of the cylinder to actuate said plunger, and means for controlling the traveling movement of the carriage and whereby the plunger may be quickly alined with a selected portion of the vehicle, and a plurality of plate elements movably connected together and operatively associated with the hoist and operating to maintain said elongated opening closed, regardless of the position of the hoist with respect to the platform.

8. The combination with a weighing platform, of a carriage mounted for traveling movement therebeneath lengthwise of the platform, a cylinder secured to the carriage and having a head at its lower end permanently closing said end of the cylinder, a plunger operable in said cylinder and projecting from the upper end thereof and having means adapted to engage the front axle of a vehicle, means for introducing a pressure fluid into the lower end of the cylinder below the plunger whereby the latter may be projected from the cylinder and into engagement with the vehicle axle, to thereby lift the front end of the vehicle, said platform having an elongated opening therein receiving the upper end of the cylinder, and whereby the latter may be moved lengthwise of the platform, a plurality of plate elements constantly closing said elongated opening, regardless of the position of the cylinder therein, and means remote from the platform for propelling said carriage.

9. The combination with a weighing platform, of a carriage mounted for traveling movement therebeneath lengthwise of the platform, a cylinder secured to the carriage and having a head at its lower end permanently closing said end of the cylinder, a plunger operable in said cylinder and projecting from the upper end thereof and having means adapted to engage the front axle of a vehicle, means for introducing a pressure fluid into the lower end of the cylinder below the plunger to thereby project the latter from the cylinder into engagement with the vehicle axle, whereby the front end of the vehicle may be elevated, said platform having a longitudinal opening therein receiving the upper end of the cylinder and whereby the latter may be moved lengthwise of the platform, and a plurality of plate elements constantly closing said elongated opening, regardless of the position of the cylinder therein, said elements having their adjacent ends overlapped whereby they may be telescoped when moved in one direction.

10. The combination with a vehicle supporting platform, of a carriage mounted for traveling movement beneath the platform lengthwise thereof, a cylinder mounted on the carriage in upright position and having a plate permanently secured to the lower end thereof to permanently seal said end to the atmosphere, a plunger in said cylinder having means at its upper end for engaging the front axle of a vehicle, means for introducing air under pressure into the lower end of the cylinder below the plunger and whereby the plunger may be projected from the upper end of the cylinder to move it into engagement with the vehicle axle, means for limiting upward movement of the plunger, said platform having an elongated opening therein in which the upper end of the cylinder is movable, and means constantly closing said opening, regardless of the position of the cylinder and plunger therein, said means comprising a plurality of relatively movable elements.

11. The combination with a vehicle supporting platform, of a carriage mounted for traveling movement beneath the platform lengthwise thereof, a cylinder mounted on the carriage in upright position and having a plate secured to the lower end thereof to permanently seal said end to the atmosphere, a plunger in said cylinder having means at its upper end for engaging the front axle of a vehicle, means for introducing air under pressure into the lower end of the cylinder below the plunger and whereby the plunger may be projected from the upper end of the cylinder to move it into engagement with the vehicle axle, means for limiting upward movement of the plunger, said platform having an elongated opening therein in which the upper end of the cylinder is movable, means constantly closing said opening, regardless of the position of the cylinder and plunger therein, and means for indicating the position of the cylinder with respect to the platform, comprising an element secured to the carriage and movable in a slot disposed lengthwise of the platform whereby an operator may aline the plunger with the part of the vehicle to be engaged thereby without getting under the vehicle.

12. The combination with a vehicle supporting platform, of a carriage mounted for traveling movement beneath the platform lengthwise thereof, a cylinder mounted on the carriage in upright position and having a plate secured to the lower end thereof to permanently seal said end to the atmosphere, a plunger in said cylinder having means at its upper end for engaging the front axle of a vehicle, means for introducing air under pressure into the lower end of the cylinder below the plunger and whereby the plunger may be projected from the upper end of the cylinder to move it into engagement with the vehicle axle, means for limiting upward movement of the plunger, said platform having an elongated opening therein receiving the upper end of the cylinder, means constantly closing said opening, regardless of the position of the cylinder and plunger therein, means for indicating the position of the carriage with respect to the platform, comprising an indicator secured to the carriage and movable therewith and visible through an opening disposed at one side of the platform whereby an operator may readily aline the plunger with the front axle of the vehicle which is to be engaged thereby, and means remote from the platform for propelling the vehicle.

13. A vehicle supporting platform having an opening therein, a hoist adapted for vertical and horizontal movements in said opening, means for horizontally moving the hoist to aline it with a portion of a vehicle to be elevated, and a plurality of overlapping elements operatively connected to the hoist and constantly closing said opening, regardless of the position of the hoist therein.

14. A vehicle supporting platform having an opening therein, a hoist adapted for vertical and horizontal movements in said opening, means for horizontally moving the hoist to aline it with a portion of a vehicle to be elevated, a plurality of overlapping plate elements constantly closing said opening, and means operatively connecting said plate elements to the hoist whereby they are operated thereby, when the latter is moved horizontally in said opening.

15. A vehicle supporting platform having an opening therein, a hoist adapted for vertical and horizontal movements in said opening, means for horizontally moving the hoist to aline it with a vehicle axle, overlapping plate elements operatively connected to the hoist and constantly closing said opening, regardless of the position of the hoist therein, and indicating means movable with the hoist to facilitate alining the latter with the vehicle axle.

16. A vehicle supporting platform having an opening therein, a hoist adapted for vertical and horizontal movements in said opening, means for horizontally moving the hoist to aline it with a vehicle axle, overlapping plate elements constantly closing said opening, flexible means operatively connecting together said elements and permitting relative movement thereof, flexible means also securing said elements to the hoist whereby they may be relatively moved when the hoist is horizontally moved in said opening, and indicating means movable with the hoist to facilitate alining the latter with the vehicle axle.

RICHARD WOODIE OGLESBY.